No. 895,750. PATENTED AUG. 11, 1908.
G. HARMS & C. SPINDLER.
HOT AIR PIPE.
APPLICATION FILED DEC. 31, 1906.
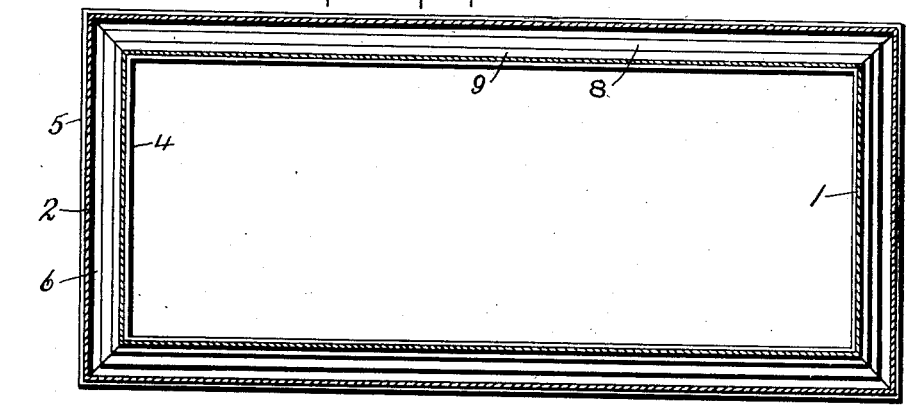
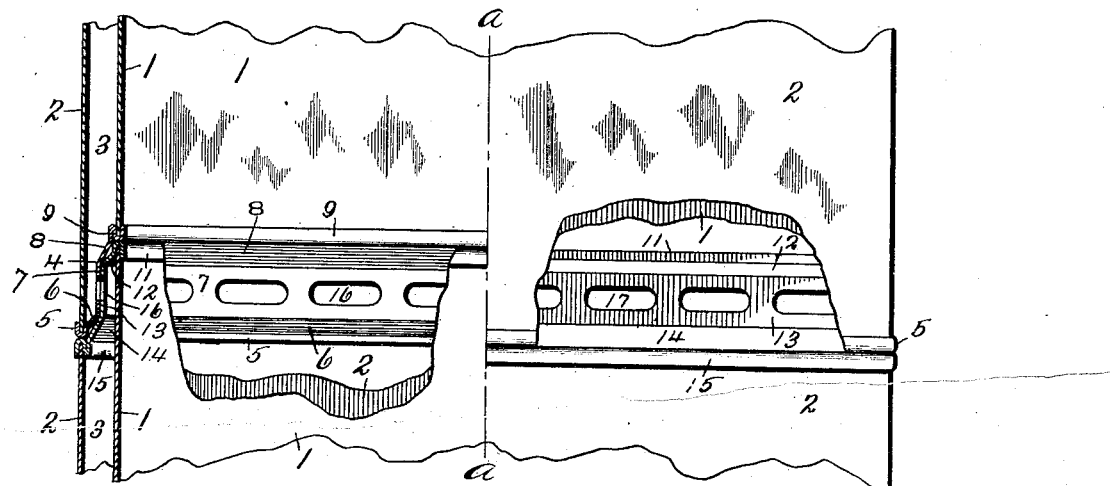
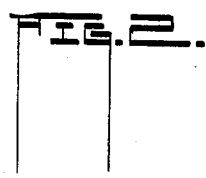

UNITED STATES PATENT OFFICE.

GEORGE HARMS AND CHARLES SPINDLER, OF PEORIA, ILLINOIS.

HOT-AIR PIPE.

No. 895,750.  Specification of Letters Patent.  Patented Aug. 11, 1908.

Application filed December 31, 1906. Serial No. 350,220.

*To all whom it may concern:*

Be it known that we, GEORGE HARMS and CHARLES SPINDLER, citizens of the United States, residing at Peoria, in the county of Peoria and State of Illinois, have invented certain new and useful Improvements in Hot-Air Pipes; and we do hereby declare that the following is a full, clear, and exact description of the invention, which will enable others skilled in the art to which it appertains to make and use the same.

This invention has reference more particularly to means for connecting sections of hot air pipes such as are used for conveying hot air up between the walls and partitions of a building, said pipes being usually rectangular in cross section and constructed of an inner pipe inclosed in the outer pipe of greater lateral dimensions than the inner pipe, so as to form an air jacket or circulating space between said pipes which prevents the hot air in the inner pipe from heating the adjacent parts of the wall or partition through which the hot air pipe is passed; and the object of our invention is to provide a cheap and simple joint whereby the sections may be easily and securely fastened together.

In the accompanying drawings which illustrate our invention, Figure 1 is a cross sectional view of the usual hot air pipe showing the herein described joining means as it appears looking lengthwise of the pipe; Fig. 2 is a side view of a hot air pipe showing two sections thereof joined together with our improved joining means, the portion at the right of the line *a—a* being an exterior view and the portion at the left of said line being in vertical section showing an interior view. Portions of this figure are also broken away to disclose more fully the joining means; and Fig. 3 is an enlarged sectional view of two parts preparatory to being joined together.

The hot air pipe is of the usual construction and consists of the inner pipe 1 of any suitable length and preferably rectangular in cross section, said pipe being surrounded by the outer pipe 2 which is larger in transverse area than the pipe 1 so as to form an air jacket or circulating space 3 around the pipe 1 and prevent the hot air in the pipe 1 from heating the adjacent parts of the wall or partition through which the hot air pipe passes. The outer section 2 which is of the same length as the inner section 1 projects a short distance beyond the inner section at the lower end and the clip 4 is provided which extends entirely around the pipe and connects the ends of the inner and outer sections. This clip is crimped to the edge of the outer section as at 5 and extends inwardly and upwardly at an angle as at 6 to a plane midway between the walls of the inner and outer pipes 1 and 2 respectively, thence upwardly for a short distance as at 7 parallel with the walls of the inner and outer pipes, thence inwardly and upwardly at an angle as at 8 to the lower edge of the inner section 1 to which it is crimped as at 9.

At the upper end of the sections the inner pipe 1 projects the same distance beyond the end of the outer pipe 2 as the outer pipe 2 does below the lower end of the inner pipe 1 and there is provided a similar clip 10 extending entirely around the hot air pipe and connecting the upper edges of the inner and outer pipes 1 and 2 respectively. This clip as is shown, is crimped to the upper edge of the inner pipe 1 as at 11, extends outwardly and downwardly as at 12 at a similar angle to the part 6 to a point midway between the walls of the inner and outer pipes, thence downwardly as at 13 parallel with the walls of the pipes 1 and 2 a similar distance to the portion 7 of the clip 4, thence downwardly and outwardly as at 14 at a similar angle to the part 8 to the upper edge of the outer pipe 2 to which it is crimped as at 15.

In joining the sections of pipe together, they are placed so that the lower end of one section meets the upper end of the section to which it is to be joined and by forcing same together the clip 10 and upper end of the pipe 1 is forced into the clip 4 and the lower end of the outer pipe 2, the angular faces 6 and 12 of the upper and lower clips respectively facilitating this operation.

In the part 13 of the clip 10 are provided a number of openings 16 which when the sections are joined together are adapted to register with corresponding openings 17 in the clip 4 so as to form air passageways between the air chambers 3 of the various sections.

While we have herein described the clip 4 as being on the lower end of the upper section and the clip 10 as being on the upper end of the lower section, it is designed that the sections shall be so connected that the clip 10 and the end of the inner pipe 1 to which it is connected shall extend into the clip 4 and the end of the outer pipe 2 in the direction in which the heated air passes through said pipe so as to prevent escape of heated air through said joint.

What we claim is:

1. A hot air pipe made in interfitting and joined counterpart sections, each section comprising inner and outer spaced pipe sections of similar cross sectional shape, a clip connecting the upper edges of the pipe sections and a clip connecting the lower edges of the pipe sections, the inner pipe projecting at its upper end beyond the outer pipe and the outer pipe projecting at its lower end beyond the inner pipe, the upper clip having its edge portions crimped to the upper edges of the sections and comprising two inclined portions extending towards one another from said crimped edge portions and a straight portion connecting said inclined portions and disposed in a plane parallel to the plane of the contiguous walls of the sections, the lower clip having its edge portions crimped to the lower edges of the sections and comprising two inclined portions extending towards one another from the crimped edge portions and a straight portion connecting said inclined portions and disposed in a plane parallel to the plane of the contiguous walls of the sections, the lower inclined portion of the lower clip forming with the straight portion thereof an obtuse angle of less degree than the angle formed by the lower inclined portion of the upper clip with the straight portion thereof, the upper inclined portion of the lower clip forming with the straight portion thereof an obtuse angle of greater degree than the angle formed by the upper inclined portion of the upper clip with the straight portion thereof, the lower clip fitting into the upper clip, the straight portions of said clips contacting and being formed with registering openings.

2. A pipe composed of sections each embodying spaced inner and outer tubes, the inner tube of one of adjacent sections extending beyond the outer tube of said section, and the outer tube of the other of said adjacent sections extending beyond the inner tube of that section, and means for joining said sections composed of a clip on each section each formed of a section of metal, the clip on the upper of said sections comprising crimped lower and upper ends firmly secured to the outer and inner tubes respectively of said section, an upwardly inclined portion terminating at a point midway between the two walls of said sections, a portion extending upwardly for a short distance parallel with the walls of said section and a second inclined portion at a less angle to the outer wall than said first named inclined portion, said clip of the lower section comprising crimped lower and upper ends firmly secured to said outer and inner tubes respectively of said section, a downwardly inclined portion, a portion extending downwardly for a short distance parallel with the walls of said section, and a second inclined portion at a less angle to the outer wall than said first named inclined portion, said parallel portions of each of said clips being normally in engagement with one another and formed with alining openings, there being a space between the respective adjacent inclined portions of the clips of the two adjacent sections when in normal relation to one another, the crimped portions of the respective clips being normally in engagement with one another.

In testimony whereof we have affixed our signatures, in presence of two witnesses.

GEORGE HARMS.
CHARLES SPINDLER.

Witnesses:
E. M. GILES,
MARY E. COMEGYS.